US012281577B2

(12) United States Patent
Chinta et al.

(10) Patent No.: US 12,281,577 B2
(45) Date of Patent: Apr. 22, 2025

(54) VARIABLE FLOWPATH CASINGS FOR BLADE TIP CLEARANCE CONTROL

(71) Applicant: General Electric Company, Schenectady, NY (US)

(72) Inventors: Raghuveer Chinta, Bengaluru (IN); Abhijit Roy, Bengaluru (IN); Vaishnav Raghuvaran, Bengaluru (IN); Srinivas Nuthi, Bengaluru (IN); Ravindra Shankar Ganiger, Bengaluru (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/657,420

(22) Filed: May 7, 2024

(65) Prior Publication Data

US 2024/0301802 A1 Sep. 12, 2024

Related U.S. Application Data

(63) Continuation of application No. 17/894,881, filed on Aug. 24, 2022, now Pat. No. 12,012,859.

(30) Foreign Application Priority Data

Jul. 11, 2022 (IN) ............................ 202211039662

(51) Int. Cl.
*F01D 11/22* (2006.01)

(52) U.S. Cl.
CPC .......... *F01D 11/22* (2013.01); *F05D 2220/32* (2013.01); *F05D 2240/55* (2013.01)

(58) Field of Classification Search
CPC ... F01D 11/22; F05D 2230/32; F05D 2240/55
See application file for complete search history.

(56) References Cited

U.S. PATENT DOCUMENTS

| | | | |
|---|---|---|---|
| 975,450 | A | 11/1910 | Ouimet |
| 1,008,882 | A | 11/1911 | Adams-Randall |

(Continued)

FOREIGN PATENT DOCUMENTS

| | | | |
|---|---|---|---|
| EP | 2466075 | A2 | 6/2012 |
| FR | 3129428 | A1 | 5/2023 |

(Continued)

OTHER PUBLICATIONS

United States Patent and Trademark Office, "Non-Final Office Action," issued in connection with U.S. Appl. No. 17/899,324, mailed on Mar. 7, 2023, 16 pages.

(Continued)

*Primary Examiner* — Eldon T Brockman
(74) *Attorney, Agent, or Firm* — HANLEY, FLIGHT & ZIMMERMAN, LLC

(57) ABSTRACT

Disclosed herein are example variable flowpath casings for blade tip clearance control. An example casing for a turbine engine includes a first annular substrate extending along an axial direction; a second annular substrate positioned radially inward relative to the first annular substrate, the second annular substrate movably coupled to the first annular substrate; and an actuator coupled to the second annular substrate such that a force applied by the actuator moves the second annular substrate relative to the first annular substrate to adjust a tip clearance.

18 Claims, 8 Drawing Sheets

(56) References Cited

U.S. PATENT DOCUMENTS

| | | | | |
|---|---|---|---|---|
| 3,085,398 | A * | 4/1963 | Ingleson | F01D 11/22 415/189 |
| 4,482,293 | A | 11/1984 | Perry | |
| 4,596,116 | A | 6/1986 | Mandet et al. | |
| 5,054,997 | A | 10/1991 | Corsmeier et al. | |
| 5,188,507 | A | 2/1993 | Sweeney | |
| 5,203,673 | A | 4/1993 | Evans | |
| 5,362,202 | A | 11/1994 | Derouet et al. | |
| 6,514,041 | B1 | 2/2003 | Matheny et al. | |
| 6,962,482 | B2 | 11/2005 | Tanaka | |
| 7,186,078 | B2 | 3/2007 | Tanaka | |
| 7,189,057 | B2 | 3/2007 | Lee et al. | |
| 7,255,528 | B2 | 8/2007 | Stretton | |
| 7,367,776 | B2 | 5/2008 | Albers et al. | |
| 7,596,954 | B2 | 10/2009 | Penda et al. | |
| 7,625,169 | B2 | 12/2009 | Manzoori | |
| 8,257,029 | B2 | 9/2012 | Habarou et al. | |
| 8,475,118 | B2 | 7/2013 | Mulcaire et al. | |
| 8,678,742 | B2 | 3/2014 | Klingels | |
| 8,834,096 | B2 | 9/2014 | Khanin | |
| 8,939,709 | B2 | 1/2015 | Nanukuttan | |
| 9,068,471 | B2 | 6/2015 | Klingels | |
| 9,255,489 | B2 | 2/2016 | DiTomasso et al. | |
| 9,371,738 | B2 | 6/2016 | Harris | |
| 9,598,975 | B2 | 3/2017 | Uskert et al. | |
| 9,683,453 | B2 | 6/2017 | Sha et al. | |
| 9,709,713 | B1 | 7/2017 | Chen | |
| 9,752,450 | B2 | 9/2017 | Duguay et al. | |
| 9,845,731 | B2 | 12/2017 | Birnkrant et al. | |
| 9,963,988 | B2 | 5/2018 | Swedowicz et al. | |
| 10,316,682 | B2 | 6/2019 | Vetters et al. | |
| 10,352,329 | B2 | 7/2019 | Nesteroff et al. | |
| 10,364,696 | B2 | 7/2019 | Virkler | |
| 10,415,419 | B2 | 9/2019 | Sun et al. | |
| 10,753,222 | B2 | 8/2020 | Eastwood et al. | |
| 11,008,882 | B2 | 5/2021 | Dierksmeier | |
| 11,255,214 | B2 | 2/2022 | Prasad et al. | |
| 11,808,157 | B1 | 11/2023 | K P et al. | |
| 12,012,859 | B2 | 6/2024 | Chinta et al. | |
| 2009/0128166 | A1 | 5/2009 | Webster | |
| 2009/0208322 | A1 | 8/2009 | Mccaffrey | |
| 2010/0303612 | A1 | 12/2010 | Bhatnagar et al. | |
| 2012/0057958 | A1* | 3/2012 | Klingels | F01D 11/22 415/1 |
| 2012/0063884 | A1* | 3/2012 | Klingels | F01D 11/22 415/128 |
| 2012/0156007 | A1 | 6/2012 | Bacic | |
| 2013/0022442 | A1* | 1/2013 | Nanukuttan | F01D 11/22 415/1 |
| 2013/0034423 | A1 | 2/2013 | Adaickalasamy et al. | |
| 2013/0177414 | A1 | 7/2013 | Bonneau et al. | |
| 2014/0064938 | A1 | 3/2014 | Eriksen et al. | |
| 2015/0044044 | A1 | 2/2015 | Sippel | |
| 2015/0218959 | A1 | 8/2015 | Barb et al. | |
| 2016/0102571 | A1 | 4/2016 | Cortequisse et al. | |
| 2016/0177753 | A1 | 6/2016 | Walston et al. | |
| 2016/0281522 | A1 | 9/2016 | Graf et al. | |
| 2016/0356168 | A1* | 12/2016 | Duguay | F01D 11/14 |
| 2017/0067366 | A1 | 3/2017 | Stricker | |
| 2017/0328230 | A1* | 11/2017 | Virkler | F04D 27/001 |
| 2018/0209292 | A1 | 7/2018 | Hiernaux | |
| 2019/0048737 | A1 | 2/2019 | Geisen et al. | |
| 2019/0128135 | A1 | 5/2019 | Skertic | |
| 2020/0332671 | A1* | 10/2020 | Dierksmeier | F01D 25/246 |
| 2021/0348519 | A1 | 11/2021 | Lee et al. | |

FOREIGN PATENT DOCUMENTS

| | | | |
|---|---|---|---|
| FR | 3129432 | A1 | 5/2023 |
| FR | 3130879 | A1 | 6/2023 |
| FR | 3130894 | A1 | 6/2023 |
| FR | 3132743 | A1 | 8/2023 |
| JP | 2012202330 | A | 10/2012 |

OTHER PUBLICATIONS

United States Patent and Trademark Office, “Final Office Action,” issued in connection with U.S. Appl. No. 17/889,899, dated Apr. 10, 2024, 23 pages.

United States Patent and Trademark Office, “Non-Final Office Action,” issued in connection with U.S. Appl. No. 17/889,899, dated Sep. 20, 2023, 18 pages.

United States Patent and Trademark Office, “Non-Final Office Action,” issued in connection with U.S. Appl. No. 17/894,881, mailed on Sep. 20, 2023, 9 pages.

United States Patent and Trademark Office, “Non-Final Office Action,” issued in connection with U.S. Appl. No. 18/493,508, mailed on Jul. 5, 2024, 14 pages.

* cited by examiner

VARIABLE FLOWPATH CASINGS FOR BLADE TIP CLEARANCE CONTROL

CROSS-REFERENCE TO RELATED APPLICATION

This patent arises from a continuation of U.S. patent application Ser. No. 17/894,881 filed Aug. 24, 2022, which claims benefit to Indian Provisional Patent Application No. 20/2211039662, which was filed on Jul. 11, 2022, and which is hereby incorporated by reference in its entirety. Priority to U.S. patent application Ser. No. 17/894,881 filed Aug. 24, 2022, and Indian Provisional Patent Application No. 20/2211039662 filed with the Intellectual Property of India on Jul. 11, 2022, is hereby claimed.

FIELD OF THE DISCLOSURE

This disclosure relates generally to turbine engines and, more particularly, to casings of a turbine engine.

BACKGROUND

A turbine engine, also referred to herein as a gas turbine engine, is a type of internal combustion engine that uses atmospheric air as a moving fluid. A turbine engine generally includes a fan and a core arranged in flow communication with one another. As atmospheric air enters the turbine engine, rotating blades of the fan and the core impel the air downstream, where the air is compressed, mixed with fuel, ignited, and exhausted. Typically, at least one casing or housing surrounds the turbine engine.

Figure 1:
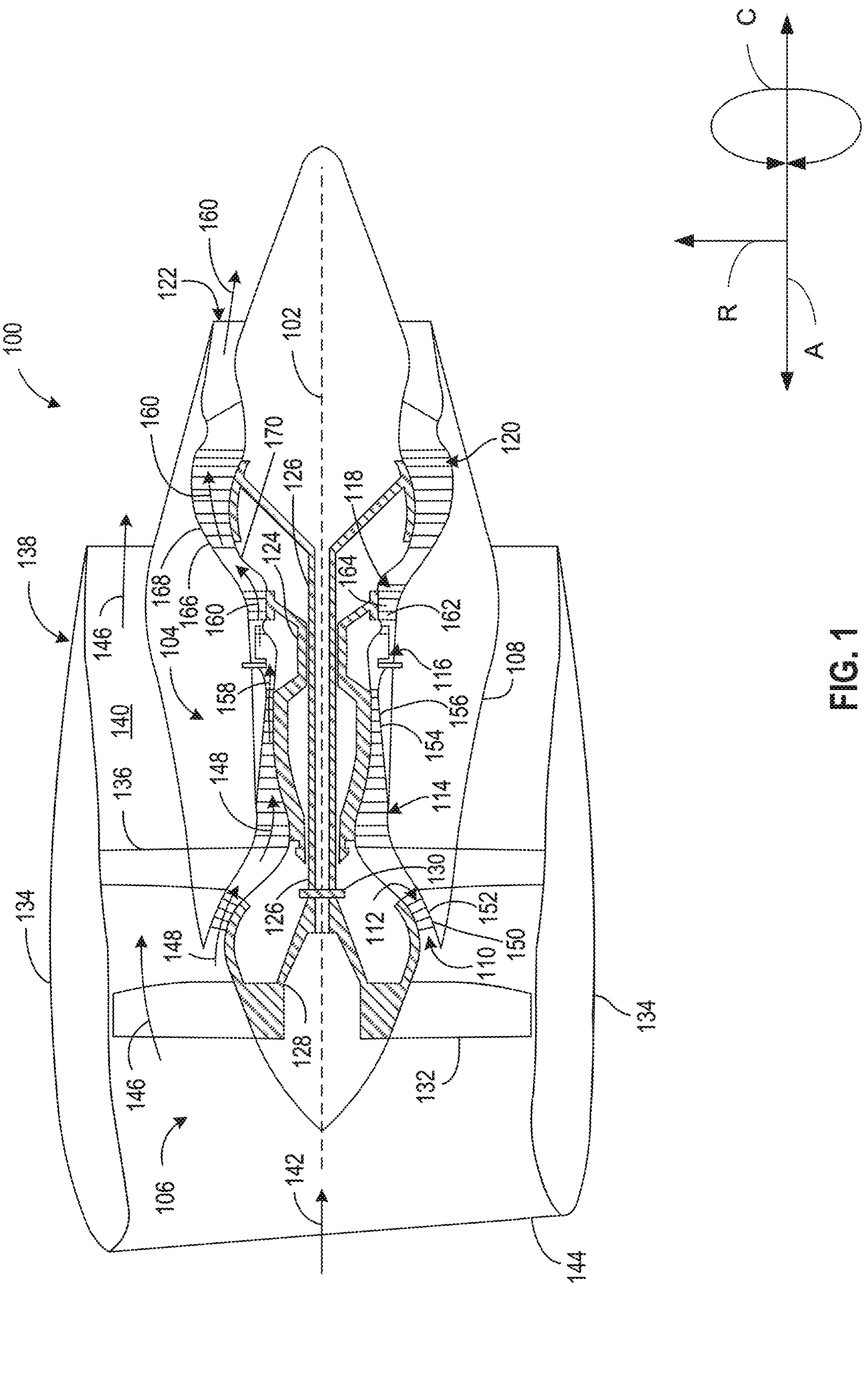
FIG. 1 is a cross-sectional view of an example gas turbine engine in which examples disclosed herein may be implemented.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used in this disclosure, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second. In some examples used herein, the term "substantially" is used to describe a relationship between two parts that is within three degrees of the stated relationship (e.g., a substantially same relationship is within three degrees of being the same, a substantially flush relationship is within three degrees of being flush, etc.). In some examples used herein, the term "substantially" is used to describe a value that is within 10% of the stated value.

In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

The terms "upstream" and "downstream" refer to the relative direction with respect to fluid flow in a fluid pathway. For example, "upstream" refers to the direction from which the fluid flows, and "downstream" refers to the direction to which the fluid flows. The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

Various terms are used herein to describe the orientation of features. In general, the attached figures are annotated with reference to the axial direction, radial direction, and circumferential direction of the vehicle associated with the features, forces and moments. In general, the attached figures are annotated with a set of axes including the axial axis A, the radial axis R, and the circumferential axis C.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

DETAILED DESCRIPTION

Turbine engines are some of the most widely-used power generating technologies, often being utilized in aircraft and power-generation applications. A turbine engine generally includes a fan positioned forward of a core that includes, in serial flow order, a compressor section (e.g., including one or more compressors), a combustion section, a turbine section (e.g., including one or more turbines), and an exhaust section. A turbine engine can take on any number of different configurations. For example, a turbine engine can include one or more compressors and turbine, single or multiple spools, ducted or unducted fans, geared architectures, etc. In some examples, the fan and a low pressure compressor are on the same shaft as a low pressure turbine and a high pressure compressor is on the same shaft as a high pressure turbine.

In operation, rotating blades of the fan pull atmospheric air into the turbine engine and impel the air downstream. At least a portion of the air enters the core, where the air is compressed by rotating blades of a compressor, combined with fuel and ignited to generate a flow of a high-temperature, high-pressure gas (e.g., hot combustion gas), and fed to the turbine section. The hot combustion gases expand as they flow through the turbine section, causing rotating blades of the turbine(s) to spin and produce a shaft work output(s). For example, rotating blades of a high pressure turbine can produce a first shaft work output that is used to drive a first compressor, while rotating blades of a low pressure turbine can produce a second shaft work output that is used to drive a second compressor and/or the fan. In some examples, another portion of the air bypasses the core and, instead, is impelled downstream and out an exhaust of the turbine engine (e.g., producing a thrust).

Typically, a turbine engine includes one or more casings that surround components of the turbine engine and define a flow passage for airflow through the turbine engine. For example, the turbine engine can include fan casing that surrounds rotor blades of the fan and one more core casings that surround rotor blades of the compressor section and/or the turbine section. A distance between a tip of a rotor blade (e.g., a rotating blade such as a fan blade, a compressor blade, etc.) and a respective casing(s) is referred to as a tip clearance. Typically, rotor blades are made using a material that is different than a material of a casing surrounding the rotor blades. A fan blade(s), for example, may be manufactured using a metal (e.g., titanium, aluminum, lithium, etc., and/or a combination thereof), whereas a casing surrounding the fan blade(s) can be made of a composite material. Thus, in some such examples, the fan blade(s) and the casing can expand at different rates based on different rates of thermal expansion of their respective materials.

In operation, the casing(s) and rotor blades experience a variety of loads that influence tip clearance, such as thermal loads, pressure loads, and mechanical loads. For example, during operation, metal rotor blades may contract in response to relatively low ambient temperatures (e.g., based on differential thermal expansion), while a composite case may not contract, resulting in tip clearance opening. Over a time period of engine operation, tip clearance can transition between a relatively large clearance and a relatively small clearance due to rotor growth and casing growth (e.g., through rotational speed of a rotor, thermal expansion of the rotating components and the casing, etc.). These transitions can result in issues with tip clearance, which can negatively impact the operability and performance of the turbine engine. In some instances, tip clearance between a blade and a casing can be substantially non-existent. In such instances, the rotor blade can rub against the casing (e.g., referred to herein as blade tip rubbing), which can result in damage to the casing, the blade, and/or another component of the turbine engine. In some instances, a relatively large tip clearance can result in performance losses. For example, a relatively large tip clearance can result in tip leakage flow. Tip leakage flow as disclosed herein refers to air flow losses in a region of the casing associated with a rotor blade tip (e.g., a tip region).

The flow field of air in the tip region (e.g., fan blade tip region, compressor blade tip region, etc.) is relatively complex due to generation of vortical structures by interaction of the axial flow with the rotor blades and a surface (e.g., of the casing) near the rotor blade tips. In the fan, for example, as tip clearance between a fan blade and a fan case increase, several vortices in the tip region are generated (e.g., tip leakage, separation and induced vortices). These interactions can lead to substantial aerodynamic loss in the fan and decreased efficiency of the turbine engine. Thus, performance of the fan is closely related to its tip leakage mass flow rate and level of tip and casing interactions. In the compressor section, interactions of tip leakage flow with the mainstream flow and other secondary flows can lead to decreased efficiency and negatively impact compressor stability. In some examples, tip flow leakage can result in compressor and/or fan instabilities such as stall and surge. Compressor and/or fan stall is a circumstance of abnormal airflow resulting from the aerodynamic stall of the rotor blades within the respective component, which causes the air flowing through the component to slow down or stagnate. Compressor and/or fan surge refers to a stall that results in the disruption (e.g., complete disruption, partial disruption, etc.) of the airflow through the respective component.

Based on the foregoing, at least one factor that determines performance of a turbine engine is tip clearance associated with a fan and/or a compressor. Typically, turbine engine performance increases with a smaller tip clearance to minimize air loss or leakage around the blade tip. If close tip clearances are not maintained, a loss of performance will be noticed in pressure capability and airflow. However, tip clearance that is too small (e.g., resulting in blade tip rubbing) can result in damage to the casing, the blade, and/or another component of the turbine engine. Thus, an ability to control (e.g., manage) tip clearance during operation of a turbine engine can be important for aerodynamic performance of a turbine engine.

Examples disclosed herein enable manufacturing of an example variable flowpath casing having a variable flowpath component that provides for blade-tip-to-case clearance control. Example variable flowpath casings disclosed herein include an example outer substrate that surrounds an example variable flowpath component. The variable flowpath component (e.g., a flexible casing flowpath above a blade tip) can be used to control blade-tip-to-case clearance by adjusting a casing flowpath surface during operation. Controlled tip clearance between a rotor blade and a casing can be a challenge due to differential thermal expansion of the rotor blade(s) material and casing material. Certain examples disclosed herein provide a material independent, system level architecture for blade tip clearance control that can be used for different blade and casing material combinations.

Example variable flowpath components can include an example facesheet(s), an example core(s), an example damper(s), an example abradable layer(s), and example linkages to couple the variable flowpath component(s) to the outer substrate. In some examples, the linkages couple a facesheet and/or an abradable layer of material to the outer substrate via an example hinge rod set(s) and an example slider link, which is operatively coupled to an example actuator(s). In some such examples, movement of the actuator can cause the slider links to slide (e.g., in an axial and/or radial direction) to cause the hinge rod set(s) to pivot about a pivot point and move the facesheet and/or the abradable layer of material in an axial and/or radial direction. For example, the facesheet and/or the abradable layer of material can move radially inwards, radially outwards, and/or is different axial directions to adjust a tip clearance between a rotor blade tip and the variable flowpath casing.

In some examples, the variable flowpath component is segmented into a plurality of segments that are arranged circumferentially. In some such examples, each segment can include one or more linkages to couple a facesheet and/or an abradable layer of material of each segment to the outer substrate. In some examples, the one or more linkages can be used to adjust a radius of the variable flowpath component to adjust a tip clearance. In some examples, the one or more linkages are coupled such that one or more segments can be actuated concurrently.

Examples disclosed herein can be used to prevent blade tip rubs on a variable flow casing, thus reducing the chances of rotor blade tip and/or casing abradable material damage or destruction. Certain examples reduce costs (e.g., maintenance costs) of rotor blades due to tip loss and casing abradable repair. As fan casing sizes grow to accommodate growing fan sizes, examples disclosed herein can reduce manufacturing, assembly, and/or maintenance efforts.

Certain example variable flowpath components include a honeycomb structure and/or a damper. Certain examples can serve a dual purpose by also acting as a compliant structure to absorb more energy and withstand increased impact load during a blade-out event. A blade-out event refers to an unintentional release of a rotor blade during operation. Structural loading can result from an impact of the rotor blade on a casing (e.g., shroud) and from the subsequent unbalance of the rotating components. Certain examples can reduce damage to a variable flowpath casing (e.g., for a fan, compressor, etc.) under an impact load.

Examples disclosed herein are discussed in connection with a variable flowpath casing for a fan section (e.g. single stage fans, multi-stage fans, etc.) of a turbine engine. It is understood that examples disclosed herein for the variable flowpath casing having the variable flowpath component may additionally or alternatively be applied to other sections of the turbine engine, including a compressor section and turbine section. Though examples disclosed herein are discussed in connection with a turbofan jet engine, it is understood that examples disclosed herein can be implemented in connection with a turbojet jet engine, a turboprop jet engine, a combustion turbine for power production, or any other suitable application.

Referring now to the drawings, wherein identical numerals indicate the same elements throughout the figures, FIG. 1 is a schematic cross-sectional view of an example high-bypass turbofan-type gas turbine engine 100. While the illustrated example is a high-bypass turbofan engine, the principles of the present disclosure are also applicable to other types of engines, such as low-bypass turbofans, turbojets, turboprops, etc. As shown in FIG. 1, the turbine engine 100 defines a longitudinal or axial centerline axis 102 extending therethrough for reference. FIG. 1 also includes an annotated directional diagram with reference to an axial direction A, a radial direction R, and a circumferential direction C. In general, as used herein, the axial direction A is a direction that extends generally parallel to the centerline axis 102, the radial direction R is a direction that extends orthogonally outwardly from the centerline axis 102, and the circumferential direction C is a direction that extends concentrically around the centerline axis 102.

In general, the turbine engine 100 includes a core turbine 104 disposed downstream from a fan (e.g., fan section) 106. The core turbine 104 includes a substantially tubular outer casing 108 that defines an annular inlet 110. The outer casing 108 can be formed from a single casing or multiple casings. The outer casing 108 encloses, in serial flow relationship, a compressor section having a booster or low pressure compressor 112 ("LP compressor 112") and a high pressure compressor 114 ("HP compressor 114"), a combustion section 116, a turbine section having a high pressure turbine 118 ("HP turbine 118") and a low pressure turbine 120 ("LP turbine 120"), and an exhaust section 122. A high pressure shaft or spool 124 ("HP shaft 124") drivingly couples the HP turbine 118 and the HP compressor 114. A low pressure shaft or spool 126 ("LP shaft 126") drivingly couples the LP turbine 120 and the LP compressor 112. The LP shaft 126 can also couple to a fan spool or shaft 128 of the fan 106. In some examples, the LP shaft 126 is coupled directly to the fan shaft 128 (e.g., a direct-drive configuration). In alternative configurations, the LP shaft 126 can couple to the fan shaft 128 via a reduction gear 130 (e.g., an indirect-drive or geared-drive configuration).

As shown in FIG. 1, the fan 106 includes a plurality of fan blades 132 coupled to and extending radially outwardly from the fan shaft 128. An annular fan casing or nacelle 134 circumferentially encloses the fan 106 and/or at least a portion of the core turbine 104. The nacelle 134 can be supported relative to the core turbine 104 by a plurality of circumferentially-spaced apart outlet guide vanes 136. Furthermore, a downstream section 138 of the nacelle 134 can enclose an outer portion of the core turbine 104 to define a bypass airflow passage 140 therebetween.

As illustrated in FIG. 1, air 142 enters an inlet portion 144 of the turbine engine 100 during operation thereof. A first portion 146 of the air 142 flows into the bypass airflow passage 140, while a second portion 148 of the air 142 flows into the inlet 110 of the LP compressor 112. One or more sequential stages of LP compressor stator vanes 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where the air 158 mixes with fuel and burns to provide combustion gases 160.

The combustion gases 160 flow through the HP turbine 118 where one or more sequential stages of HP turbine stator vanes 162 and HP turbine rotor blades 164 coupled to the HP shaft 124 extract a first portion of kinetic and/or thermal energy therefrom. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof. A turbine frame 170 with a fairing assembly is located between the HP turbine 118 and the LP turbine 120. The turbine frame 170 acts as a supporting structure, connecting a high-pressure shaft's rear bearing with the turbine housing and forming an aerodynamic transition duct between the HP turbine 118 and the LP turbine 120. Fairings form a flow path between the high-pressure and low-pressure turbines and can be formed using metallic castings (e.g., nickel-based cast metallic alloys, etc.).

Along with the turbine engine 100, the core turbine 104 serves a similar purpose and is exposed to a similar environment in land-based gas turbines, turbojet engines in which the ratio of the first portion 146 of the air 142 to the second portion 148 of the air 142 is less than that of a turbofan, and unducted fan engines in which the fan 106 is devoid of the nacelle 134. In each of the turbofan, turbojet, and unducted engines, a speed reduction device (e.g., the reduction gear 130) can be included between any shafts and spools. For example, the reduction gear 130 is disposed between the LP shaft 126 and the fan shaft 128 of the fan 106.

As described above with respect to FIG. 1, the turbine frame 170 is located between the HP turbine 118 and the LP turbine 120 to connect the high-pressure shaft's rear bearing with the turbine housing and form an aerodynamic transition duct between the HP turbine 118 and the LP turbine 120. As such, air flows through the turbine frame 170 between the HP turbine 118 and the LP turbine 120.

Figure 2:
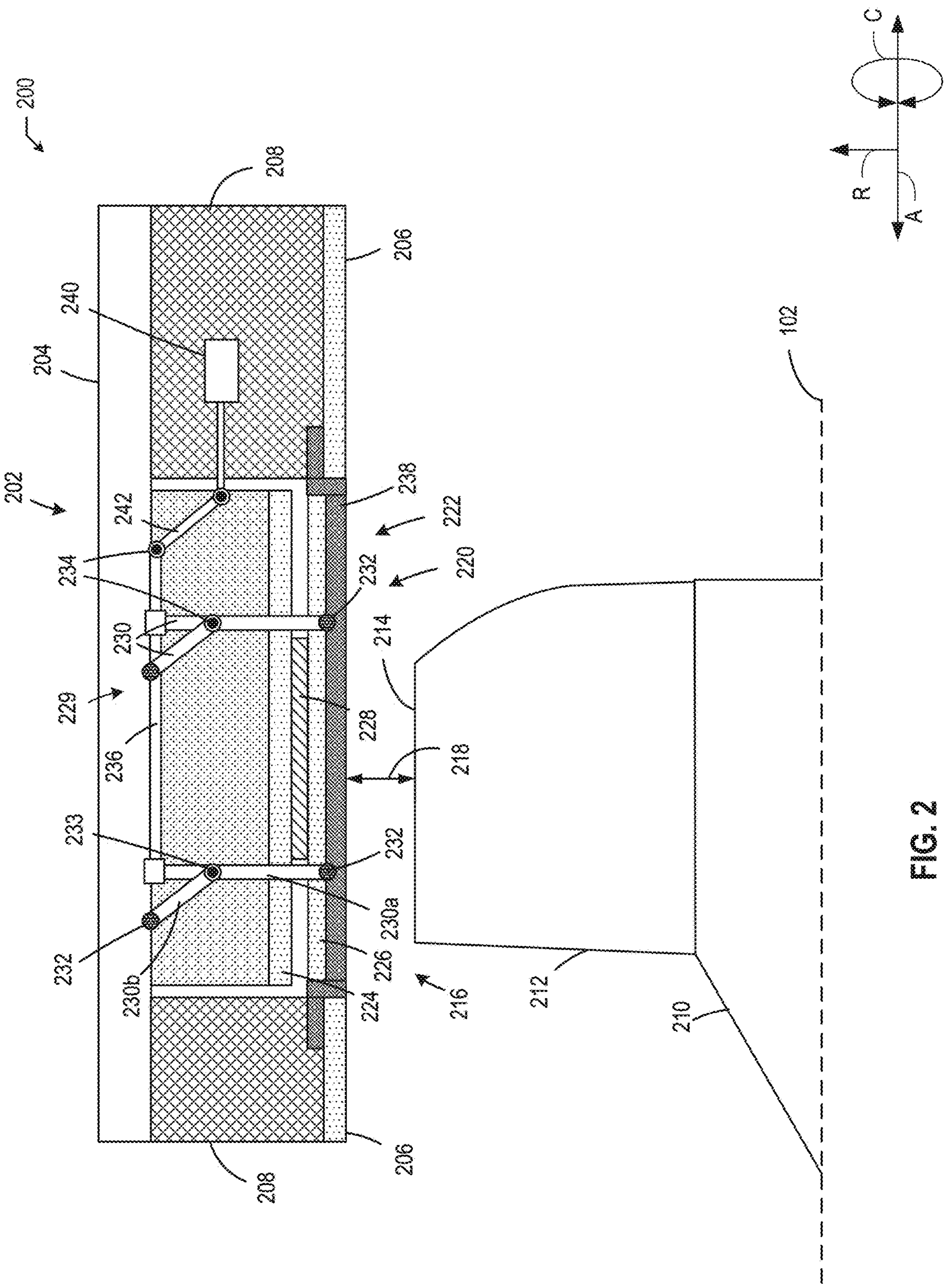
FIG. 2 is a partial cross-sectional view of an example fan including an example variable flowpath casing and an example variable flowpath component structured in accordance with the teachings of this disclosure.

FIG. 2 is a schematic cross-sectional illustration of an example fan 200 of an example turbine engine (e.g., turbine engine 100 of FIG. 1) above an axial centerline (e.g., centerline axis 102), including an example variable flowpath casing (e.g., shroud) 202 constructed in accordance with the teachings of this disclosure. The variable flowpath casing 202 defines at least one flowpath for air that flows through the turbine engine 100. The variable flowpath casing 202 includes an example outer substrate (e.g., shell, casing, etc.) 204, which is an annular substrate that extends along an axial direction to surround and/or house the fan 200. In some examples, the outer substrate 204 is made of a composite material. However, the outer substrate 204 can be manufactured using other materials in additional or alternative examples, such as aluminum, etc. In some examples, the outer substrate 204 implements first substrate means. In some examples, the outer substrate 204 changes radius along the axial direction, sloping radially inward along the axial direction. In additional or alternative examples, the outer substrate 204 may slope radially outward along the axial direction and/or may maintain a constant radius along the axial direction.

The variable flowpath casing 202 of FIG. 2 includes an example facesheet(s) 206. In some examples, the facesheet 206 is coupled to the outer substrate 204 to provide a structure to support components of the fan 200. The example facesheet 206 may also be used as a structure to absorb impact from a blade (e.g., ice impact, etc.) without damaging the blade and/or blade tip (e.g., through use of abradable material).

The variable flowpath casing 202 of FIG. 2 includes an example impact structure 208 between the outer substrate 204 and the facesheet 206. The impact structure 208 can be, for example, a honeycomb layer, a viscoelastic material, etc.

In some examples, the impact structure 208 provides a rigidity to the facesheet 206 that allows for the facesheet 206 to remain stable under changing flight conditions. In some examples, the impact structure 208 absorbs energy of an impacting material, such as a rotor blade. In some examples, the impact structure 208 used to provide a sound dampening effect and/or a blade tip damage mitigating effect in a blade out event (e.g., when flight conditions cause a rotor blade to break off within an engine) through its collapsible nature.

The variable flowpath casing 202 circumferentially surrounds an example shaft 210 and an example rotor blade(s) 212 of the fan 200. While one rotor blade 212 is the illustrated in FIG. 2, the fan 200 includes an array of rotor blades 212 that are spaced circumferentially around the shaft 210, extending radially outwards towards the variable flowpath casing 202. The rotor blade(s) 212 includes an example blade tip 214 at a radially outward portion of the rotor blade 212. In operation, the rotor blades 212 spin in a circumferential direction to impel air downstream.

An example blade tip region 216 of the variable flowpath casing 202 is illustrated at a region of the variable flowpath casing 202 at the blade tip 214. The blade tip region 216 is associated with an example tip clearance 218, defined by a distance between the blade tip 214 and the blade tip region 216 of the variable flowpath casing 202. During operation of the turbine engine 100, the variable flowpath casing 202 experiences significant loads that influence the blade tip region(s) 216 and more specifically, the tip clearance 218. For example, the tip clearance 218 between the blade tip 214 and the blade tip region 216 of the variable flowpath casing 202 can transition between a relatively large clearance and relatively small clearance. In some examples, a relatively large clearance may be between 4% to 10% of the axial cord. A relatively small (e.g., substantially non-existent) clearance can allow the blade tip 214 to rub against the blade tip region 216 of the variable flowpath casing 202. Further, the changes in tip clearance 218 may affect the airflow through the turbine engine 100 resulting in performance losses and/or stalls (e.g., fan stall, compressor stall, etc.) by allowing air to bypass the rotor blades 212. Accordingly, the variable flowpath casing 202 includes an example variable flowpath component (e.g., mechanism, surface, ring, system, etc.) 220 structured in accordance with the teachings of this disclosure to control blade-tip-to-casing clearance. The variable flowpath component 220 implements an example variable flowpath surface that can adjust with rotor and/or casing changes during operation to increase performance of a fan 106, 200, a compressor section, and/or, more generally, the turbine engine 100.

The variable flowpath component 220 is positioned radially inward from the outer substrate 204 at an example trench (e.g., cavity, opening, etc.) 222 of the variable flowpath casing 202. In some examples, the trench 222 implements cavity means. The example trench 222, which is positioned at the blade tip region 216 of the variable flowpath casing 202, extends axially from a forward end (e.g., forward of a rotor blade 212) towards an aft end (e.g., aft of the rotor blade 212). The trench 222 extends from the facesheet 206 radially outwards to the outer substrate 204. In some examples, the variable flowpath casing 202 includes more than one trench 222. For example, the variable flowpath casing 202 can include an additional or alternative trench(es) 222 at another tip region of the fan 200 and/or at a tip region(s) of an array(s) of compressor rotor blades.

The variable flowpath component 220 of FIG. 2 includes an example outer facesheet 224, an example inner facesheet 226, an example damper 228, and an example linkage mechanism 229 that includes example hinge rod sets 230, example fixed hinge joints 232, example rotation joints 234, and an example slider link (e.g., slider joint) 236. The damper 228 can be, for example, a viscoelastic material and/or another other damping material or structure. In the illustrated example of FIG. 2, the damper 228 is positioned between the outer facesheet 224 and the inner facesheet 226. Thus, the damper 228, which is sandwiched between the facesheets 224, 226, can trap and/or dissipate vibrations made on either side of the facesheets 224, 226. For example, the damper 228 can reduce vibrations that transfer to the variable flowpath casing 202 from pressures of the rotor blades 212. In some examples, the damper 228 absorbs impactors from the rotor blades 212 before impactors (e.g., blade-out events) are transmitted to directly onto the outer substrate 204. In some examples, the damper 228 is coupled to the inner facesheet 226 and/or to the outer facesheet 224.

In some examples, the outer facesheet 224 is a rigid facesheet and the inner facesheet 226 is a flexible facesheet. However, the outer facesheet 224 can be a flexible facesheet in additional or alternative examples. Similarly, the inner facesheet 226 can be a rigid facesheet in additional or alternative examples. In some examples, the inner facesheet 226 implements second substrate means. The inner facesheet 226 of FIG. 2 includes an example abradable layer 238, which is at least one layer of an abradable material (e.g., rubber, nickel-aluminum, etc.) applied to a radially inward surface of the inner facesheet 226. For example, the abradable layer 238 can be rub strips with supporting lips. In some examples, the abradable layer 238 is a layer of abradable material coated (e.g., sprayed) onto the inner surface of the inner facesheet 226. In some examples, the inner facesheet 226 and abradable layer 238 define a variable flowpath surface of the variable flowpath casing 202. In some examples, the inner facesheet 226 and abradable layer 238 define a variable flowpath surface of the variable flowpath casing 202. In some examples, the abradable layer 238 implements second substrate means. In some examples, the abradable layer 238 implements abradable means. As discussed in further detail below, the inner facesheet 226 and abradable layer 238 can be moved in axial and/or radial direction to control the tip clearances 218.

An example hinge rod set 230 includes an example first hinge rod(s) 230*a* and an example second hinge rod(s) 230*b*. In some examples, the hinge rod set 230 implements hinge means. In the illustrated example of FIG. 2, the example hinge rod sets 230 and fixed hinge joints 232 couple the inner facesheet 226 to the outer substrate 204. For example, the first hinge rods 230*a* can be coupled to the inner facesheet 226 at a first end (e.g., using fixed hinge joints 232) and to the example slider link 236 at a second end. In the example of FIG. 2, a first end of the second hinge rods 230*b* can be coupled to the outer substrate 204 using the fixed hinge joint 232. Further, a second end of the second hinge rods 230*b* can be coupled to the first hinge rods 230*a* at an example hinge point 233 using example rotation (e.g., revolute, spherical, etc.) joints 234. The slider link 236 of FIG. 2 is coupled to an example actuator 240 via an example connection rod 242 and rotation joints 234. The actuator 240 can be any suitable actuator, such as a pneumatic actuator, hydraulic actuator, electro-mechanical actuator, piezo-electric actuator, a shape memory alloy (SMA) and/or another thermally compliant material, etc. In some examples, the actuator 240 implements actuation means. In some examples, the slider link 236 implements slider joint means.

In operation, the actuator 240 can apply a force (e.g., pushing force, pulling force, etc.) on the connection rod 242, which can apply a pulling force on the slider link 236. The force on the slider link 236 causes the slider link 236, which is coupled to the hinge rod sets 230, to move in a substantially axial direction. The movement of the slider link 236 in the axial direction causes a pulling force at the first end of the first hinge rods 230*a*. The pulling force on the first hinge rods 230*a* causes the first end of the first hinge rods 230*a* to move in the axial direction. However, because the first hinge rods 230*a* are coupled to the second hinge rods 230*b* (e.g., which are fixed to the outer substrate 204 via the fixed hinge joints 232) via the rotation joints 234 at the hinge points 233, the pulling force on the first hinge rods 230*a* causes the hinge rods 230*a* to rotate (e.g., pivot) about the hinge points 233. The rotation of the first hinge rods 230*a* about the hinge points 233 causes a pulling force on the inner facesheet 226, which causes the inner facesheet 226 to move in a radially outward direction. The movement of the inner facesheet 226 results in an increased tip clearance 218 between a rotor blade tip 214 and the abradable layer 238 on the inner facesheet 226. Similarly, the actuator 240 can apply a pushing force on the connection rod 242, which can cause the inner facesheet 226 to move in a radially inward direction to decrease tip clearance 218 between a rotor blade tip 214 and the abradable layer 238 on the inner facesheet 226.

In some examples, the first hinge rods 230*a* include a telescopic tub. A telescopic tube in a structure in which a first component (e.g., a tube, rod, etc.) fits inside, and slides relative to, a second component (e.g., a tube, etc.). The telescopic tube allows movement of the first component relative to the second component such that the telescopic tube can increase and/or decrease in length based on the sliding. Thus, one or more first hinge rods 230*a* may be telescopic tubes, enabling such first hinge rods 230*a* to expand or retract, altering a length of the first hinge rods 230*a* and providing for additional radial movement.

It is understood that the variable flowpath component 220 can be configured differently in additional or alternative examples. In the example of FIG. 2, the outer facesheet 224 and/or the inner facesheet 226 extends circumferentially (e.g., 360 degrees) around the rotor blades 212. In some examples, the variable flowpath casing 202 includes multiple linkage mechanisms and/or actuators 240 that are spaced circumferentially about the variable flowpath casing 202. In some examples, the linkage mechanisms are circumferentially coupled with one another to move variable flowpath surfaces of the variable flowpath casing 202 synchronously during operation. In some examples, the outer facesheet 224 and/or the inner facesheet 226 can be segmented into a plurality of sections. For example, the outer facesheet 224 and/or the inner facesheet 226 can be segmented to generate multiple (e.g., six) circumferentially movable flowpath surfaces that can be connected via linkages. In some such examples, each segment can include a linkage mechanism and/or actuator 240. The segments in such examples can be controlled individually (e.g., with individual actuators), synchronously (e.g., with one or more actuators), and/or in sub-sets (e.g., one or more segments controlled synchronously). In some examples, a number of segments can depend upon clearance needs of a specific turbine engine 100. Thus, segments that need more tip clearance 218 can be actuated separately from segments that need less tip clearance 218.

In some examples, the actuator 240, slider link 236, and/or other components of the linkage mechanism can be configured to move in additional or alternative directions. In some examples, the linkage mechanism can be a lattice structure to reduce impact loads on the variable flowpath casing 202. In some examples, the actuator 240 is mounted within the variable flowpath casing 202. In some examples, the actuator 240 is fixed to an outer surface of the outer substrate 204. In some examples, the actuator 240 is removably coupled to the outer surface of the outer substrate 204 to provide flexibility repairs, inspections, or other maintenance of the variable flowpath casing 202.

While two hinge rod sets 230 at a segment are illustrated in FIG. 2, additional or alternative examples can include one hinge rod set 230 and/or more than two hinge rod sets 230 within variable flowpath casing 202 segment. The first hinge rods 230*a* and/or the second hinge rods 230*b* can be made of a polymer matrix composite (PMC) material, chopped fiber PMCs, a metal(s), and/or other materials that can withstand pressure and/or temperatures associated with the variable flowpath casing 202. The first hinge rods 230*a* and/or the second hinge rods 230*b* can be made using an additive manufacturing process and/or a subtractive manufacturing process.

In some examples, the variable flowpath component 220 and/or the turbine engine 100 includes an example clearance control system (discussed in relation to FIG. 8) to detect tip clearance 218 and/or actuate variable flowpath surface(s). The clearance control system can include, at least, a sensor to detect tip clearance 218, a controller to monitor tip clearance 218 at a blade tip region 216, and/or the actuator(s) 240. For example, the controller may identify a relatively large and/or a relatively small tip clearance 218. The controller may be a human and/or monitoring circuitry controlled by an electronic compute device such a computer. In response to identifying the relatively large and/or the relatively small tip clearance 218, the controller may be structured to cause the actuator(s) 240 to move to increase cause a variable flowpath surface to move (e.g., radially inwards, radially outwards, axially, etc.) to adjust the tip clearance 218.

Additional or alternative variable flowpath components for an example variable flowpath casing(s) 202 are described in further detail below. The example variable flowpath components disclosed below are applied to the example turbine engine 100 of FIGS. 1-2. As such, the details of the parts (e.g., blade tip 214, blade tip region 216, tip clearance 218, outer substrate 204, trench 222, etc.) are not repeated in connection with FIGS. 3-10. Further, the same reference numbers used for the structures shown in FIG. 2 are used for similar or identical structures in FIGS. 3-10.

Examples disclosed below are applied to the example fan 200 of the example turbine engine 100 as described in FIGS. 1-2. It is understood, however, that examples disclosed herein may be implemented in additional or alternative fans. Further, examples disclosed herein may be implemented in one or more core engine casings, such as at a compressor section, turbine section, etc. Further, examples disclosed herein may be applied to a variety of turbine engines, such as a multi-spool turbine engine, a turboshaft engine, turbine engines with one compressor section, etc.

Figure 3:
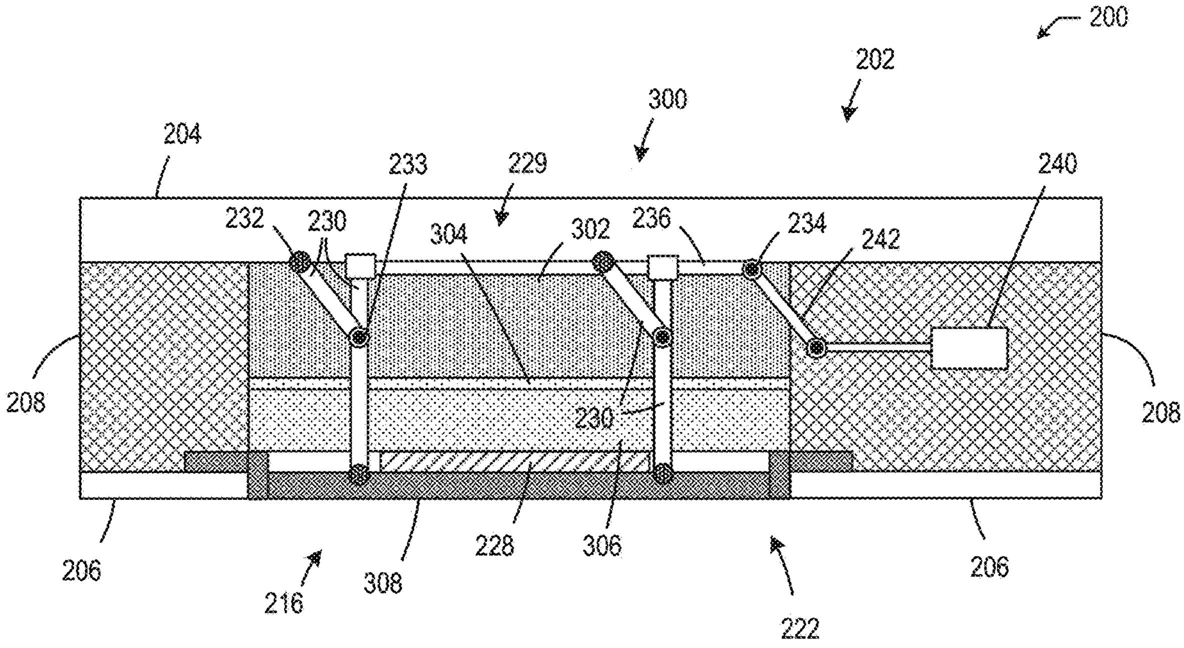
FIG. 3 is a schematic cross-sectional axial view of another example variable flowpath component for a variable flowpath casing in accordance with the teachings of this disclosure.

FIG. 3 is a schematic cross-section illustration of another example variable flowpath component 300 of an example variable flowpath casing 202 of a turbine engine 100 structured in accordance with the teachings of this disclosure to control blade-tip-to-casing clearance. The example variable flowpath component 300 of FIG. 3 is similar to the variable flowpath component 220 of FIG. 2. As such, the variable flowpath component 300 includes the example damper 228, the example linkage mechanism 229 (e.g., example hinge rod sets 230, example fixed hinge joints 232, example rotation joints 234, and an example slider link 236), and the example actuator 240. However, the variable flowpath component 300 of FIG. 3 includes a different core structure within the trench 222.

The variable flowpath component 300 of FIG. 3 includes an example first core 302 that is coupled to a radially inward surface of the outer substrate 204. For example, the first core 302 can be an aluminum core and/or another type of core. The variable flowpath component 300 includes an example core facesheet 304 coupled to a radially inward surface of the first core 302. For example, the core facesheet 304 can be similar to the facesheets 206, 224, 226 of FIG. 2.

The variable flowpath component 300 of FIG. 3 includes an example second core 306 coupled to a radially inward surface of the core facesheet 304. The second core 306 can be, for example, Kevlar®-based core and/or another type of core. The variable flowpath component 300 includes an example abradable layer 308, which is at least one layer of abradable material (e.g., rubber, nickel-aluminum, etc.). For example, the abradable layer 308 can be rub strips with supporting lips. In some examples, the abradable layer 308 defines a variable flowpath surface of the variable flowpath casing 202. As discussed in further detail below, the abradable layer 308 can be moved in axial and/or radial direction to control the tip clearances 218. In some examples, the abradable layer 308 implements second substrate means. In some examples, the abradable layer 308 implements abradable means.

In the example of FIG. 3, example hinge rod sets 230 are coupled to the outer substrate 204, the slider link 236, and to the abradable layer 308. In operation, the actuator 240 can apply a force (e.g., pushing force, pulling force, etc.) on a connection rod 242 (e.g., telescopic tube), which applies a pulling force on the slider link 236. The force on the slider link 236 causes the slider link 236, which is coupled to the hinge rod sets 230, to move in a substantially axial direction. The movement of the slider link 236 in the axial direction causes a pulling force at the first end of the first hinge rods 230*a*. The pulling force on the first hinge rods 230*a* causes the hinge rods 230*a* to rotate about the hinge points 233, which causes a pulling force on the abradable layer 308. The pulling force on the abradable layer 308 causes the abradable layer 308 to move in an axial and/or radial direction to adjust (increase) tip clearance 218 between a rotor blade tip 214 and the abradable layer 308. Similarly, the actuator 240 can apply a pushing force on the connection rod 242, which can cause the abradable layer 308 to move in an opposite axial and/or radial direction to adjust (e.g., decrease) tip clearance 218 between a rotor blade tip 214 and the abradable layer 308.

Figure 4:
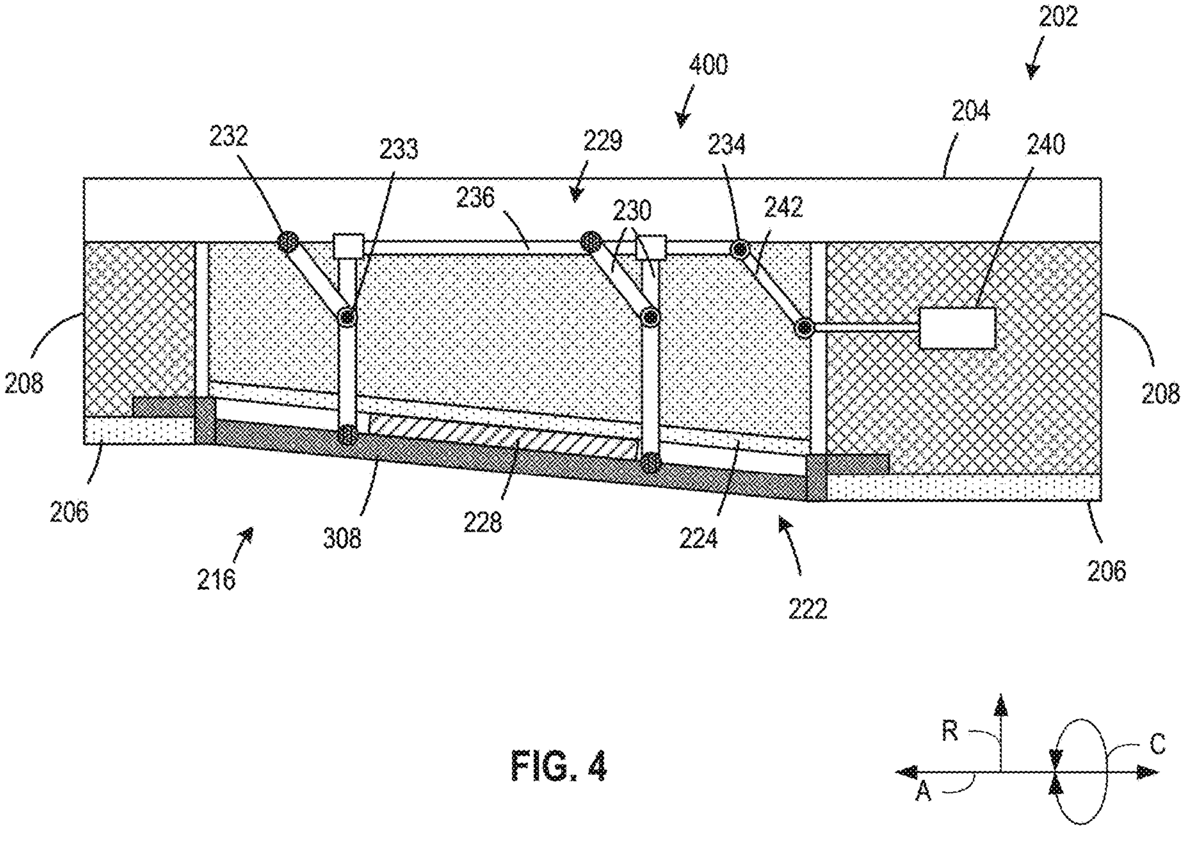
FIG. 4 is a schematic cross-sectional axial view of another example variable flowpath component for a variable flowpath casing in accordance with the teachings of this disclosure.

FIG. 4 is a schematic cross-section illustration of another example variable flowpath component 400 of an example variable flowpath casing 202 of a turbine engine 100 structured in accordance with the teachings of this disclosure to control blade-tip-to-casing clearance. The example variable flowpath component 400 of FIG. 4 is similar to the variable flowpath component 220 of FIG. 2. As such, the variable flowpath component 400 includes the example damper 228, the example linkage mechanism 229 (e.g., example hinge rod sets 230, example fixed hinge joints 232, example rotation joints 234, and an example slider link 236), and the example actuator 240. However, the variable flowpath component 400 of FIG. 4 includes a radius that changes along the axial direction, sloping radially inward along the axial direction. In additional or alternative examples, the variable flowpath component 400 may slope radially outward along the axial direction and/or may maintain a constant radius along the axial direction.

Figure 5:
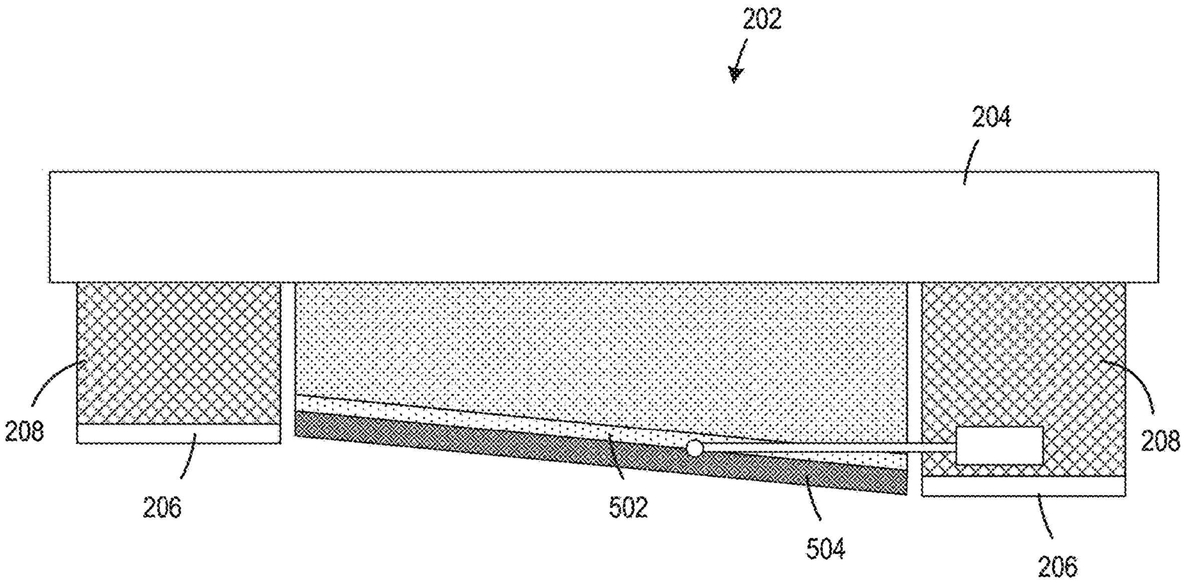
FIG. 5 is a schematic cross-sectional circumferential view of an example variable flowpath casing, including an example segmented variable flowpath component, in accordance with the teachings of this disclosure.

FIG. 5 is a schematic cross-section illustration of another example variable flowpath component 500 of an example variable flowpath casing 202 of a turbine engine 100 structured in accordance with the teachings of this disclosure to control blade-tip-to-casing clearance. The example variable flowpath component 500 of FIG. 5 is similar to the variable flowpath component 400 of FIG. 4. As such, the variable flowpath component 500 includes a radius that changes along the axial direction, sloping radially inward along the axial direction. In additional or alternative examples, the variable flowpath component 500 may slope radially outward along the axial direction and/or may maintain a constant radius along the axial direction. However, the variable flowpath component 500 of FIG. 5 does not include the example linkage mechanism (e.g., example hinge rod sets 230, example fixed hinge joints 232, example rotation joints 234, and an example slider link 236). Rather, the variable flowpath component 500 of FIG. 5 includes an example actuator 240 that is coupled to an example facesheet 502 having an example abradable layer 504. In some examples, the facesheet 502 and/or the abradable layer 504 implement second substrate means. In some examples, the abradable layer 504 implements abradable means.

In some examples, the actuator 240 is positioned to apply a substantially axial force on the facesheet 502 to cause the facesheet and the abradable layer 504 to move a same axial direction. Because the variable flowpath component 500 may slopes along the axial direction, the movement of the facesheet 502 and the abradable layer 504 can enable the facesheet 502 and the abradable layer 504 to move away from and/or towards an example rotor blade tip 214 to adjust a tip clearance 218. In some examples, the actuator 240 is positioned to apply a force that is tangential to a slope of the variable flowpath component 500. For example, the actuator 240 can apply a tangential force on the variable flowpath component 500 can cause the facesheet 502 and the abradable layer 504 to move in a partially axial direction to adjust a tip clearance 218. However, the actuator 240 can be positioned and configured to apply force in other directions in additional or alternative examples.

Figure 6:
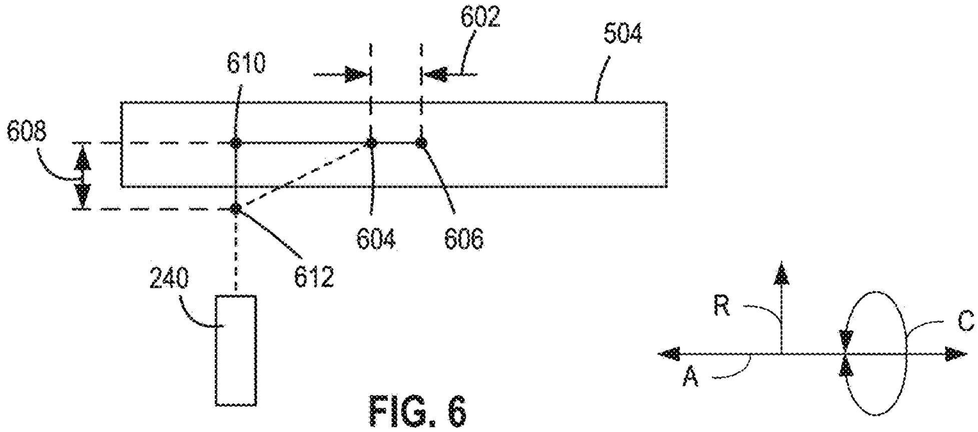
FIG. 6 is a schematic cross-sectional axial view of another example variable flowpath component for a variable flowpath casing in accordance with the teachings of this disclosure.

FIG. 6 is a schematic partial illustration of an example abradable layer 504 coupled to an example actuator 240. As illustration in FIG. 6, the actuator 240 can apply a force to the abradable layer 504 to cause the abradable layer 504 to move an example first distance 602 from an example first position 604 to an example second position 606. For example, the movement of the abradable layer 504 from the first position 604 to the second position 606 can be in the axial direction. In some examples, the actuator 240 can apply a force to the abradable layer 504 to cause the abradable layer 504 to move an example second distance 608 from an example third position 610 to an example fourth position 612. For example, the movement of the abradable layer 504 from the third position 610 to the fourth position 612 can be in the radial direction. In some examples, the actuator 240 can apply a tangential force to the abradable layer 504 to cause the abradable layer 504 to move in an axial-radial direction.

Figure 7:
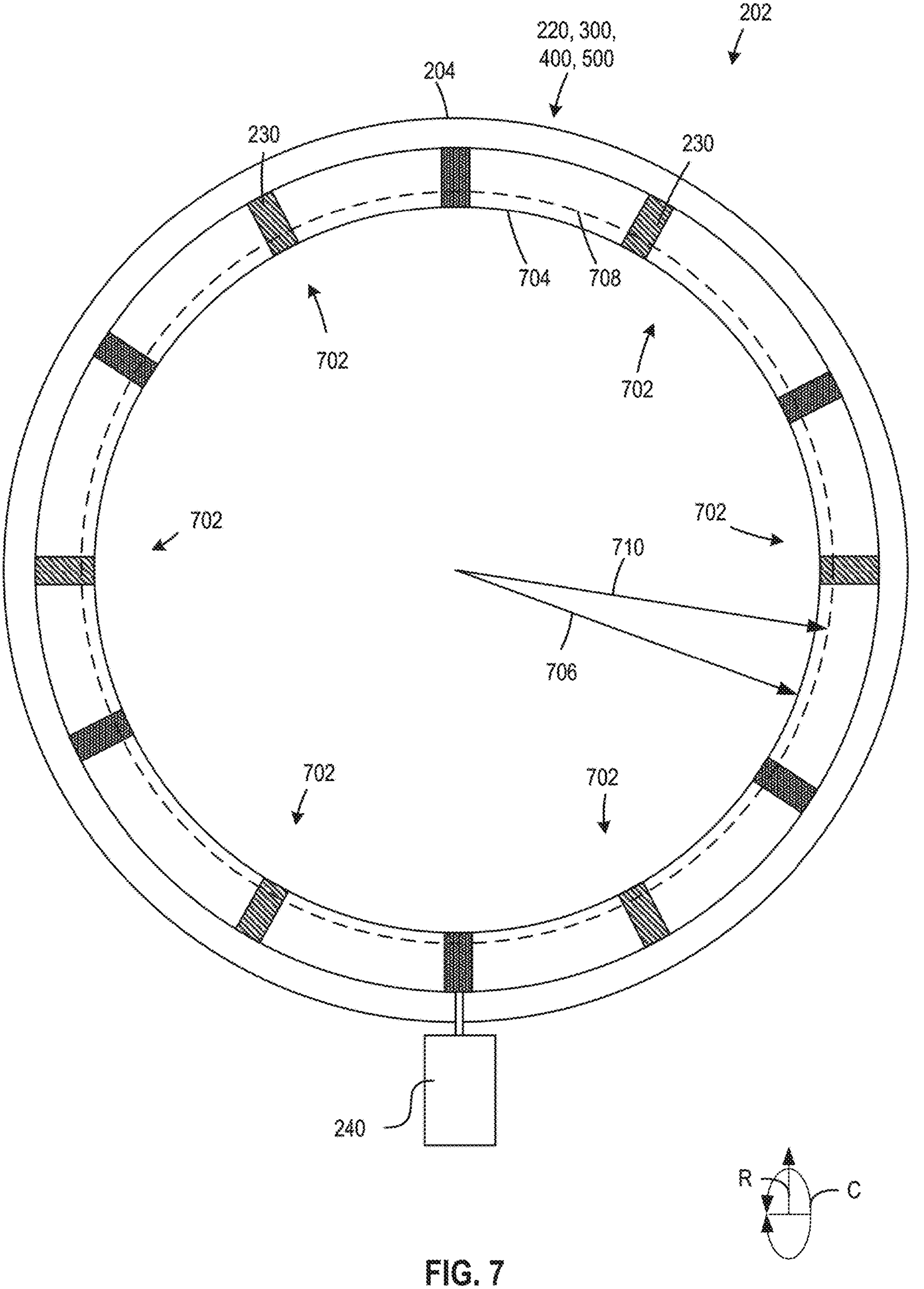
FIG. 7 is a schematic cross-sectional axial view of another example variable flowpath component for a variable flowpath casing in accordance with the teachings of this disclosure.

FIG. 7 is a schematic circumferential view of the example variable flowpath casing 202 in accordance with the teachings of this disclosure. The variable flowpath casing 202 includes the outer substrate 204 and an example variable flowpath component 220, 300, 400, 500. Some example variable flowpath component 220, 300, 400 includes a plurality of hinge rod sets 230 that couple an abradable material (e.g., abradable layer 238, 308) (e.g., via an inner facesheet 226) to the outer substrate 204. In the illustrated example of FIG. 7, the variable flowpath component 220, 300, 400, 500 is sectored into a plurality of segments 702. The segments 702 can include an example hinge rod set 230 and/or other linkage components to actuate the variable flowpath component 220, 300, 400, 500.

In some examples, the segments 702 are coupled to one another. In some examples, each segment 702 includes one or more actuators 240. In some such examples, each segment 702 may actuate individually. In some examples, the hinge rod sets 230 and/or other linkage components for the segments 702 are connected via at least one linkage and actuated concurrently with one or more actuators 240. It is understood that the variable flowpath component 220 can take on other configurations in additional or alternative examples.

The variable flowpath component 220, 300, 400, 500 segments 702 are structured to move from an example first position 704 associated with an example first radius 706. Upon detection of a tip clearance 218 issue, the variable flowpath component 220, 300, 400, 500 can be actuated to move towards an example second position 708 associated with an example second radius 710 that is different (e.g., larger or smaller) than the first radius 706. For example, an example actuator 240 can be used to apply a force to an abradable layer 504 and/or to a linkage mechanism 229 to cause a variable surface to move radially inwards or radially outwards to control a tip clearance 218.

Figure 8:
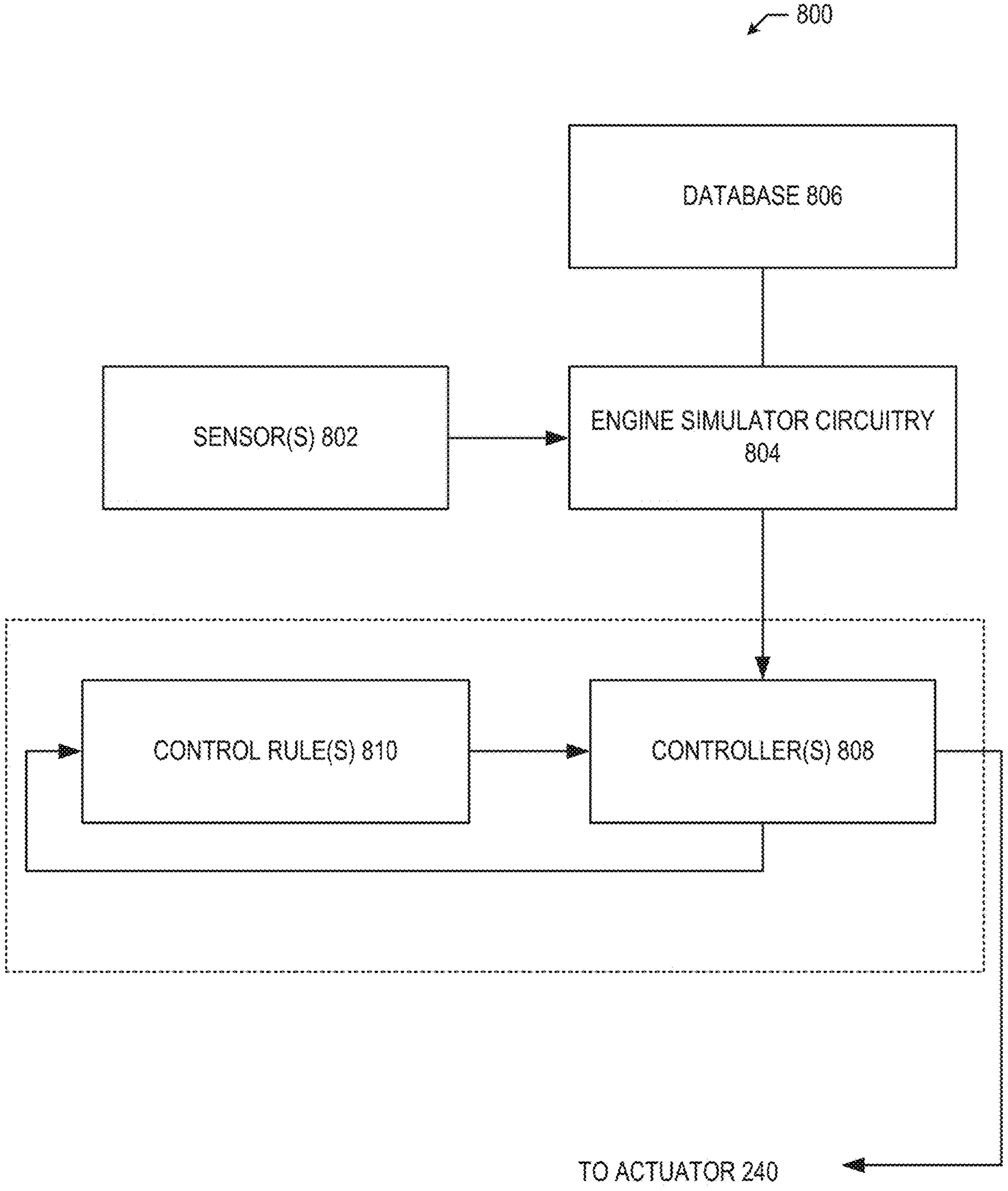
FIG. 8 is a block diagram of an example clearance control system to control a tip clearance between a rotor blade tip and a variable flowpath casing in accordance with the teachings of this disclosure.

FIG. 8 is a block diagram of an example clearance control system 800 to determine tip clearance 218 and actuate a variable flowpath component 220, 300, 400, 500. The clearance control system 800 of FIG. 8 may be instantiated (e.g., creating an instance of, bring into being for any length of time, materialize, implement, etc.) by processor circuitry such as a central processing unit executing instructions. Additionally or alternatively, the clearance control system 800 of FIG. 8 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 8 may, thus, be instantiated at the same or different times. Some or all of the circuitry may be instantiated, for example, in one or more threads executing concurrently on hardware and/or in series on hardware. Moreover, in some examples, some or all of the circuitry of FIG. 8 may be implemented by one or more virtual machines and/or containers executing on the microprocessor.

The clearance control system 800 includes at least one example sensor(s) 802, which is structured to monitor components of a turbine engine (e.g., turbine engine 100). For example, the sensor(s) 802 can sense any number of operating characteristic of the turbine engine 100 (e.g., during operation). The sensor(s) 802 can include a temperature sensor to detect ambient temperature, a proximity sensor to detect tip clearance, an altitude sensor, power lever angle sensor, and/or another type of sensor(s).

The clearance control system 800 includes example engine simulator circuitry 804, which is structured to simulate the turbine engine 100 performance based on data from the sensor(s). In some examples, the engine simulator circuitry 804 is instantiated by processor circuitry executing engine simulation instructions and/or configured to perform operations such as those represented by the flowchart of FIG. 9. During operation, the sensor(s) 802 can sense an operating characteristic associated with variable flowpath casing 202. For instance, the operating characteristic can be the tip clearance 218. The engine simulator circuitry 804 can receive data from the sensor(s) 802 can analyze the data. In some examples, the engine simulator circuitry 804 can apply a machine-learned model to determine whether to actuate an example variable flowpath component.

The clearance control system 800 includes an example database 806, which is storage circuitry for storing information. For example, the database 806 can store data collected from the sensor(s) 802, machine-learning model(s), and/or other information for maintaining clearance control.

The clearance control system 800 includes an example controller 808, which is structured to control one or more components of the turbine engine 100. The controller 808 can be one controller and/or a system of controllers. In some examples, the controller 808 can be an engine controller (e.g., an Electronic Engine Controller (EEC), an Electronic Control Unit (ECU), etc.). In some examples, the controller 808 can be operated as a control device of a FADEC system. Based on information from the engine simulator circuitry 804 and example control rules 810, the controller 808 can be configured to actuate an example actuator (e.g., actuator 240) in response to identification of a relatively large and/or relatively small tip clearance 218.

The clearance control system 800 includes example control rules 810, which determine an ideal or otherwise good tip clearance 218 of the turbine engine 100. Based on the tip clearance 218, the control rules 810 provide information regarding when to actuate an actuator 240 of an example variable flowpath component 220, 300, 400, 500 to increase and/or decrease the tip clearance 218 by adjusting a flowpath surface of a variable flowpath casing 202.

While an example manner of implementing the clearance control system 800 of FIG. 8 is illustrated in FIG. 8, one or more of the elements, processes, and/or devices illustrated in FIG. 8 may be combined, divided, re-arranged, omitted, eliminated, and/or implemented in any other way. Further, the example engine simulator circuitry 804, example controller 808, and/or, more generally, the example clearance control system 800 of FIG. 8, may be implemented by hardware alone or by hardware in combination with software and/or firmware. Thus, for example, any of the example engine simulator circuitry 804, example controller 808, and/or, more generally, the example clearance control system 800, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example clearance control system 800 of FIG. 8 may include one or more elements, processes, and/or devices in addition to, or instead of, those illustrated in FIG. 8, and/or may include more than one of any or all of the illustrated elements, processes and devices.

Figure 9:
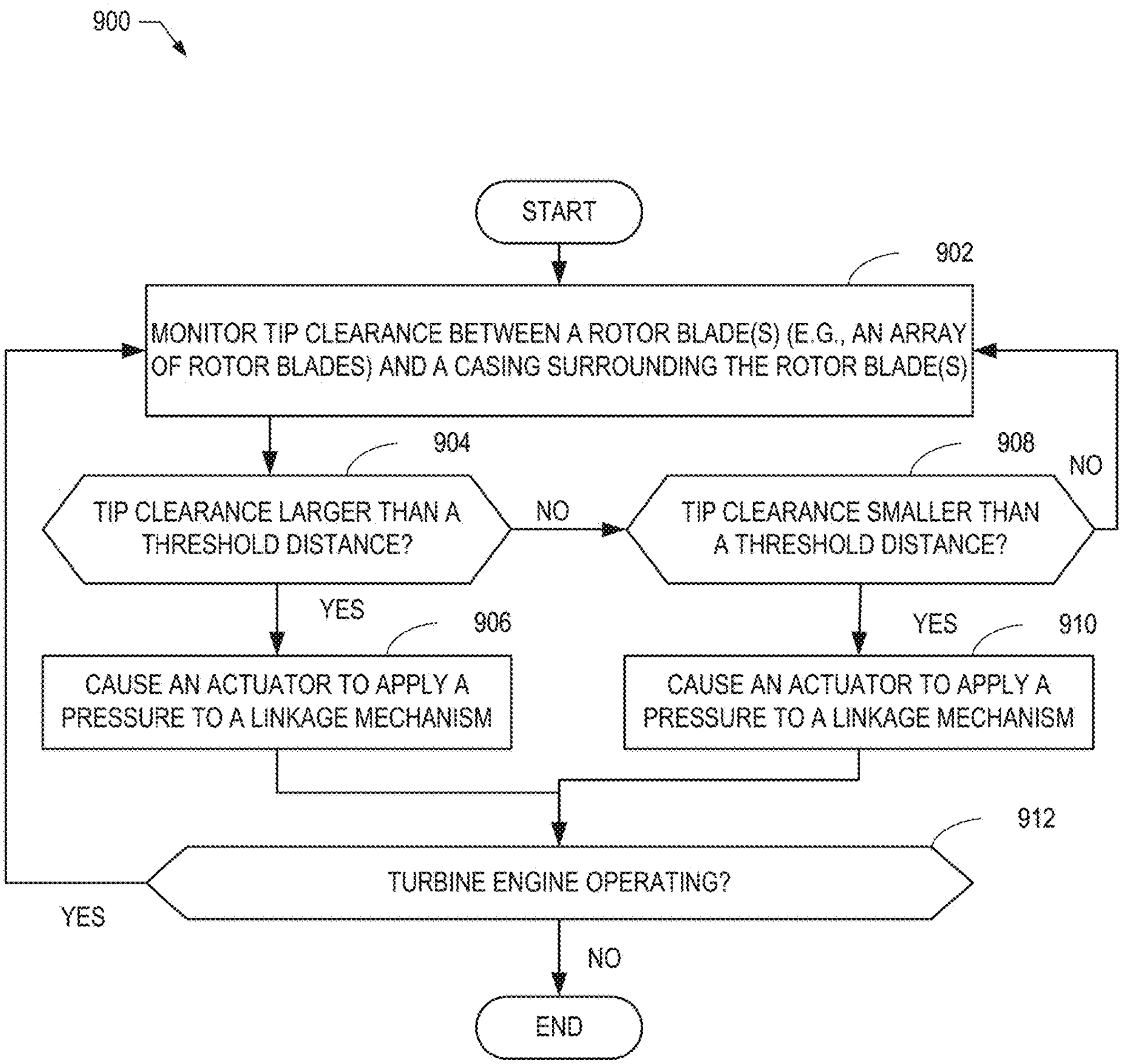
FIG. 9 is a flowchart representative of example machine readable instructions and/or example operations that may be executed by example processor circuitry to implement the clearance control system of FIG. 8.

A flowchart representative of example hardware logic circuitry, machine readable instructions, hardware implemented state machines, and/or any combination thereof for implementing the clearance control system 800 of FIG. 8 is shown in FIG. 9. The machine readable instructions may be one or more executable programs or portion(s) of an executable program for execution by processor circuitry, such as the processor circuitry 1012 shown in the example processor platform 1000 discussed below in connection with FIG. 10. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 8, many other methods of implementing the example clearance control system 800 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 9 is a flowchart representative of example machine readable instructions and/or example operations 900 that may be executed and/or instantiated by processor circuitry to actuate an example variable flowpath component. The machine readable instructions and/or the operations 900 of FIG. 9 begin at block 902, at which example engine simulator circuitry 804 monitors tip clearance 218 between a rotor blade(s) 132, 152, 156, 212 (e.g., an array of rotor blades) and blade tip region 216 of a casing 108, 134, 138, 202 surrounding the rotor blades. For example, the engine simulator circuitry 804 can receive sensor data from an example sensor(s) 802 to determine tip clearance 218 (e.g., in real time).

At block 904, the engine simulator circuitry 804 determines whether the tip clearance 218 is larger than a threshold distance (e.g., 40 mils, etc.). When the answer to block 904 is YES, control advances to block 906, at which example controller 808 causes an example actuator(s) 240 to apply a force to an example connection rod 242, which applies a force to a slider link 236 to cause a surface of the variable flowpath casing 202 to move to adjust the tip clearance 218. Control then advances to block 912. When the answer to block 904 is NO, control advances to block 908.

At block 908, the engine simulator circuitry 804 determines whether the tip clearance 218 is smaller than a threshold distance (e.g., 20 mils, etc.). When the answer to block 908 is YES, control advances to block 910, at which the example controller 808 causes an example actuator(s) 240 to apply a force to an example connection rod 242, which applies a force to a slider link 236 to cause a surface of the variable flowpath casing 202 to move to adjust the tip clearance 218. Control then advances to block 912. When the answer to block 904 is NO, control advances to block 902, at which the engine simulator circuitry 804 continues to monitor tip clearance 218. At block 912, the controller 808 determines whether the turbine engine 100 is operating. When the answer to block 912 is YES, control advances to block 902, at which the engine simulator circuitry 804 continues to monitor tip clearance 218.

Figure 10:
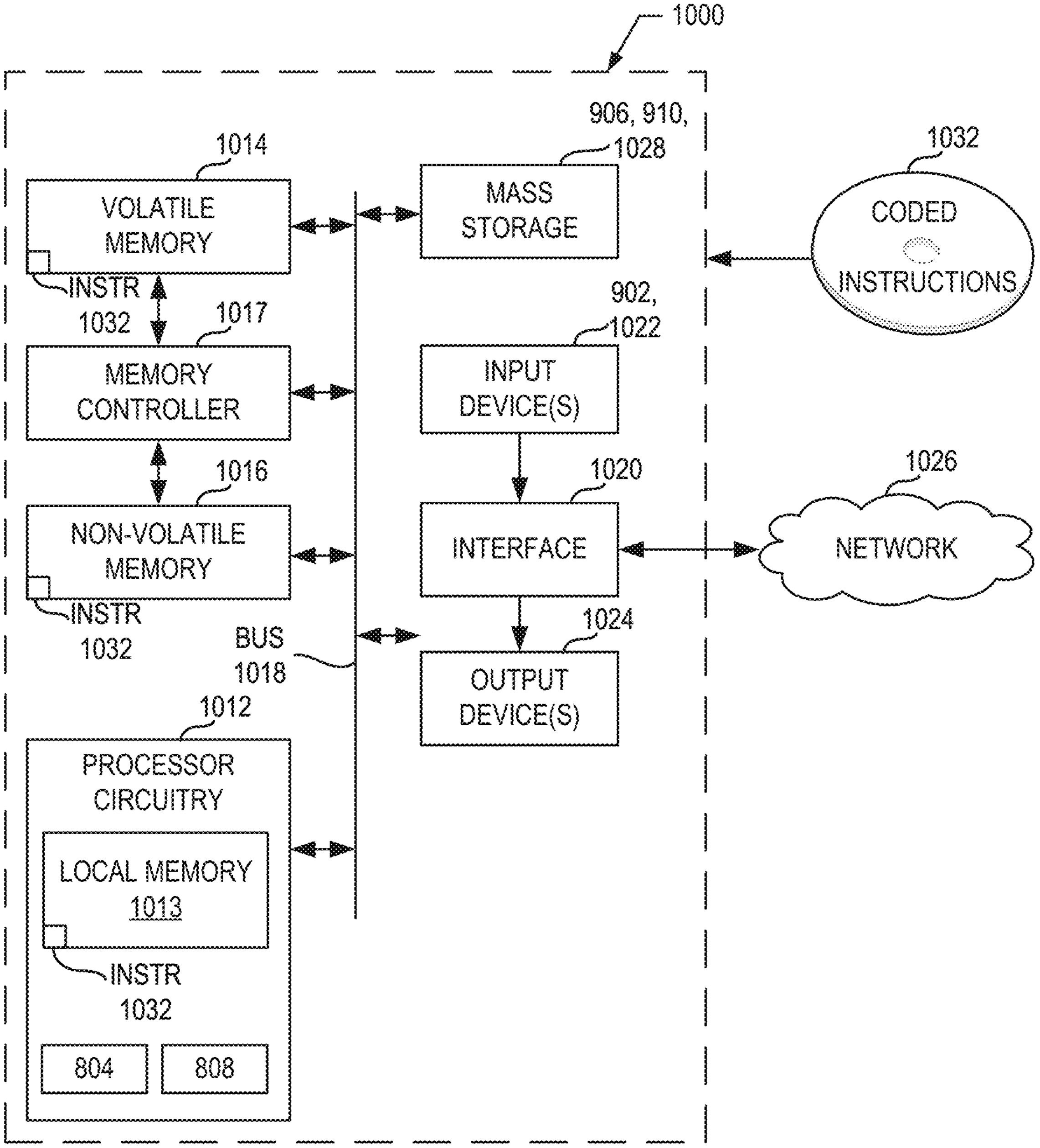
FIG. 10 is a block diagram of an example processing platform including processor circuitry structured to execute the example machine readable instructions and/or the example operations of FIG. 9 to implement the clearance control system of FIG. 8.

FIG. 10 is a block diagram of an example processor platform 1000 structured to execute and/or instantiate the machine readable instructions and/or the operations of FIG. 9 to implement the clearance control system 800 of FIG. 8. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs, microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements example engine simulator circuitry 804, example controller 808, etc.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1032, which may be implemented by the machine readable instructions of FIG. 10, may be stored in the mass storage device 1028, in the volatile memory 1014, in the non-volatile memory 1016, and/or on a removable non-transitory computer readable storage medium such as a CD or DVD.

From the foregoing, it will be appreciated that example variable flowpath casing are disclosed herein that enable blade tip to casing clearance control. Example variable flowpath casings disclosed herein include a variable flowpath surface implemented by an example variable flowpath mechanism to manage tip clearance. Example variable flowpath components disclosed herein can adjust a surface of an example variable flowpath casing to reduce a tip clearance that is larger than a desired tip clearance or to increase a tip clearance that is smaller than a desire tip clearance.

Further aspects of the present disclosure are provided by the subject matter of the following clauses:

Example 1 includes a casing for a turbine engine, the casing comprising a first annular substrate extending along an axial direction, a second annular substrate positioned radially inward relative to the first annular substrate, the second annular substrate movably coupled to the first annular substrate, and an actuator coupled to the second annular substrate such that a force applied by the actuator moves the second annular substrate relative to the first annular substrate to adjust a tip clearance.

Example 2 includes the casing of example 1, further including a hinge rod set to couple the second annular substrate to the first annular substrate, the hinge rod set including a first hinge rod to couple the second annular substrate to a slider joint and a second hinge rod to couple the first hinge rod to the first annular substrate at a connection point.

Example 3 includes the casing of any preceding clause, wherein the actuator applies the force to the second annular substrate indirectly by applying the force to the slider joint, the slider joint to pull the first hinge rod to cause the first hinge rod to rotate about the connection point, the rotation of the first hinge rod to apply a force to the second annular substrate to cause the second annular substrate to move relative to the first annular substrate.

Example 4 includes the casing of example 1, wherein the second annular substrate is movable in at least one of the axial direction or a radial direction.

Example 5 includes the casing of any preceding clause, wherein the first annular substrate includes a cavity at a radially inward surface of the first annular substrate, and wherein the second annular substrate is positioned at least partially within a cavity of the first annular substrate.

Example 6 includes the casing of any preceding clause, wherein the second annular substrate is a layer of abradable material.

Example 7 includes the casing of any preceding clause, wherein the second annular substrate is a facesheet, the facesheet including a layer of abradable material.

Example 8 includes the casing of any preceding clause, wherein the second annular substrate includes a plurality of segments, and wherein the segments are movably coupled to one another, the segments to be moved concurrently.

Example 9 includes the casing of any preceding clause, wherein the second annular substrate includes a plurality of segments and a plurality of actuators movably coupled to the plurality of segments, and wherein the plurality of actuators enable ones of the plurality of segments to move asynchronously.

Example 10 includes the casing of any preceding clause, wherein the actuator is removably coupled to an outer surface of the first annular substrate.

Example 11 includes a turbine engine housing comprising an outer shell extending in an axial direction, outer shell to circumferentially surround a portion of a turbine engine, an inner annular substrate movably coupled to an inner annular surface of the outer shell, and an actuator coupled to the inner annular substrate to move the inner annular substrate relative to the outer shell to adjust a tip clearance.

Example 12 includes the turbine engine housing of any preceding clause, further including a hinge rod set to couple the inner annular substrate to the outer shell, the hinge rod set including a first hinge rod to couple the inner annular substrate to a slider joint and a second hinge rod to couple the first hinge rod to the outer shell at a connection point.

Example 13 includes the turbine engine housing of any preceding clause, wherein the actuator applies the force to the inner annular substrate indirectly by applying the force to the slider joint, the slider joint to pull the first hinge rod to cause the first hinge rod to rotate about the connection point, the rotation of the first hinge rod to apply a force to the inner annular substrate to cause the inner annular substrate to move relative to the outer shell.

Example 14 includes the turbine engine housing of any preceding clause, wherein the inner annular substrate moves in an axial direction.

Example 15 includes the turbine engine housing of any preceding clause, wherein the inner annular substrate moves in a radial direction.

Example 16 includes the turbine engine housing of any preceding clause, wherein the inner annular substrate is a layer of abradable material.

Example 17 includes the turbine engine housing of any preceding clause, wherein the inner annular substrate is a facesheet, the facesheet including a layer of abradable material.

Example 18 includes the turbine engine housing of any preceding clause, wherein the inner annular substrate includes a plurality of segments, one or more of the segments operatively coupled to the actuator, the actuator to move the corresponding one or more of the segments concurrently.

Example 19 includes the turbine engine housing of any preceding clause, wherein the inner annular substrate includes a plurality of segments, the turbine engine component further including a plurality of actuators, ones of the actuators moveably coupled to respective ones of the segments, the ones of the segments to be actuated individually.

Example 20 includes casing for a turbine engine, the casing comprising first substrate means extending along an axial direction, the first substrate means including a trench, second substrate means positioned at the trench of the first substrate means, and actuation means to move the second substrate means relative to the first substrate means.

Example 21 includes the casing for the turbine engine of any preceding clause, further including hinge means coupled between the second substrate means and the first substrate means, the hinge means including (a) a first hinge rod coupled between the second substrate means and slider joint means and (b) a second hinge rod coupled between the first substrate means and a connection point of the first hinge rod.

Example 22 includes the casing for the turbine engine of any preceding clause, wherein the actuation means applies the force to the second substrate means indirectly by applying the force to the slider joint means, the slider joint means to pull the first hinge rod to cause the first hinge rod to rotate about the connection point, the rotation of the first hinge rod to apply the force to the second substrate means to cause the second substrate means to move relative to the first substrate means.

Example 23 includes the casing for the turbine engine of any preceding clause, wherein the second substrate means is movable in the axial direction.

Example 24 includes the casing for the turbine engine of any preceding clause, wherein the second substrate means is movable in a radial direction.

Example 25 includes the casing for the turbine engine of any preceding clause, wherein the first substrate means includes cavity means at a radially inward surface of the first substrate means, and wherein the second substrate means is positioned at least partially within the cavity means of the first substrate means.

Example 26 includes the casing for the turbine engine of any preceding clause, wherein the second substrate means is a layer of abradable means.

Example 27 includes the casing for the turbine engine of any preceding clause, wherein the second substrate means is a facesheet, the facesheet including a layer of abradable means.

Example 28 includes the casing for the turbine engine of any preceding clause, wherein the second substrate means includes a plurality of segments, and wherein the plurality of segments are movably coupled to one another, the plurality of segments concurrently movable.

Example 29 includes the casing for the turbine engine of any preceding clause, wherein the actuation means is removably coupled to an outer surface of the first substrate means.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A casing for a turbine engine, the casing comprising:

a first annular substrate extending along an axial direction, the first annular substrate including a first section and a second section;

a second annular substrate, the second annular substrate positioned inward relative to the first annular substrate and movably coupled to the first annular substrate, the second annular substrate including a third section and a fourth section; and an actuator coupled to the second annular substrate such that a force applied by the actuator moves the third section relative to the first section and the fourth section relative to the second section, wherein a first distance between the first section and the third section is different than a second distance between the second section and the fourth section, and wherein the first distance and the second distance are based on a threshold tip clearance.

2. The casing of claim 1, wherein the actuator is a first actuator and further including a second actuator coupled to the second annular substrate, such that a first force applied by the first actuator moves the third section relative to the first section and a second force applied by the second actuator moves the fourth section relative to the second section.

3. The casing of claim 2, wherein the first actuator and the second actuator move the third section and the fourth section synchronously.

4. The casing of claim 1, wherein the first section and the second section are connected by a first linkage and the third section and the fourth section are connected by a second linkage.

5. The casing of claim 4, wherein the first linkage and the second linkage form a lattice structure.

6. A method of actuating the casing of claim 1, the method comprising:

monitoring a first clearance between a tip of a rotor blade and the casing;

determining whether the first clearance is larger than a first threshold distance;

determining whether the first clearance is smaller than a second threshold distance, wherein the threshold tip clearance is a distance between the first threshold distance and the second threshold distance; and in response to the first clearance being larger than the first threshold distance or the first clearance being smaller than the second threshold distance, cause the actuator to apply pressure to a linkage.

7. A casing for a turbine engine, the casing comprising:

a first annular substrate and a second annular substrate, the second annular substrate positioned inward relative to the first annular substrate and movably coupled to the first annular substrate;

an actuator coupled to the second annular substrate such that a force applied by the actuator moves the second annular substrate relative to the first annular substrate to adjust a tip clearance; and a hinge rod set coupled between the second annular substrate and the first annular substrate, the hinge rod set including:

(a) a first hinge rod coupled between the second annular substrate and a slider joint, the first hinge rod to include a telescopic tube in which a first component fits inside and slides relative to a second component; and (b) a second hinge rod coupled between the first annular substrate and a connection point of the first hinge rod.

8. The casing of claim 7, wherein the first component slides relative to the second component to expand and retract a length of the first hinge rod.

9. The casing of claim 8, wherein the expansion and the retraction of the length of the first hinge rod is based on a radial distance for the tip clearance.

10. The casing of claim 7, wherein a force applied on the first hinge rod causes the slider joint to move in an axial direction.

11. The casing of claim 10, wherein the movement of the slider joint causes movement of an abradable layer to adjust the tip clearance between a rotor blade tip and the abradable layer.

12. A method of actuating the casing of claim 7, the method comprising:

monitoring the tip clearance between a rotor blade and the casing;

determining whether the tip clearance is larger than a first threshold distance;

determining whether the tip clearance is smaller than a second threshold distance; and in response to the tip clearance being larger than the first threshold distance or the tip clearance being smaller than the second threshold distance, cause the actuator to apply pressure to a linkage.

13. A casing for a turbine engine, the casing comprising:

a first means for housing a fan, the first means extending along an axial direction, the first means including a first section and a second section;

a second means for housing the fan, the second means for housing the fan positioned inward relative to the first means and movably coupled to the first means, the second means for housing the fan including a third section and a fourth section; and a means for actuating, the means for actuating moves the second means for housing the fan relative to the first means, wherein the means for actuating includes a hinge rod coupled between the second means for housing the fan and a slider joint, the hinge rod including a telescopic tube in which a first component fits inside and slides relative to a second component.

14. The casing of claim 13, wherein the means for actuating includes an actuator coupled to the second means for housing the fan such that a force applied by the actuator moves the third section relative to the first section and the fourth section relative to the second section.

15. The casing of claim 13, wherein the means for actuating includes a first actuator and a second actuator coupled to the second means for housing the fan, such that a first force applied by the first actuator moves the third section relative to the first section and a second force applied by the second actuator moves the fourth section relative to the second section.

16. The casing of claim 13, wherein a first distance between the first section and the third section is different than a second distance between the second section and the fourth section, wherein the first distance and the second distance is based on a threshold tip clearance.

17. The casing of claim 13, wherein the first component slides relative to the second component to expand and retract a length of the hinge rod.

18. The casing of claim 17, wherein the expansion and the retraction of the length of the hinge rod moves the third section relative to the first section based on a radial distance for tip clearance.

* * * * *